US010718970B2

(12) United States Patent
Han et al.

(10) Patent No.: US 10,718,970 B2
(45) Date of Patent: Jul. 21, 2020

(54) DISPLAY SUBSTRATE, MANUFACTURING METHOD THEREOF, DISPLAY PANEL, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lin Han, Beijing (CN); Chunlei Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/096,123

(22) PCT Filed: Apr. 9, 2018

(86) PCT No.: PCT/CN2018/082369
§ 371 (c)(1),
(2) Date: Oct. 24, 2018

(87) PCT Pub. No.: WO2018/223765
PCT Pub. Date: Dec. 13, 2018

(65) Prior Publication Data
US 2019/0137812 A1   May 9, 2019

(30) Foreign Application Priority Data

Jun. 7, 2017   (CN) .......................... 2017 1 0423069

(51) Int. Cl.
*G02F 1/1335*   (2006.01)
*G02F 1/1333*   (2006.01)
(Continued)

(52) U.S. Cl.
CPC .. *G02F 1/133512* (2013.01); *G02F 1/133345* (2013.01); *G02F 1/133514* (2013.01);
(Continued)

(58) Field of Classification Search
CPC ......... G02F 1/133512; G02F 1/136209; G02F 1/133514; G02F 1/133345;
(Continued)

(56) References Cited

U.S. PATENT DOCUMENTS 5,445,923 A  *  8/1995  Takahashi .............. B41M 5/267
                                                       430/340
2002/0089624 A1* 7/2002 Matsumoto ....... G02F 1/133512
                                                       349/106
(Continued)

FOREIGN PATENT DOCUMENTS

CN   103926739 A   7/2014
CN   103926742 A   7/2014
(Continued)

OTHER PUBLICATIONS

International Search Report of PCT/CN2018/082369 in Chinese, dated Jun. 22, 2018, with English translation.
(Continued)

*Primary Examiner* — Shan Liu
(74) *Attorney, Agent, or Firm* — Collard & Roe, P.C.

(57) ABSTRACT

A display substrate, a manufacturing method thereof, a display panel, and a display device are disclosed. The display substrate includes a display region and a non-display region located around the display region, the display substrate includes: a base substrate and a black matrix located in the non-display region on the base substrate; at least one concave portion is located in the black matrix, and the at least one concave portion is filled with a non-transparent insulating material.

5 Claims, 4 Drawing Sheets

(51) Int. Cl.
  *G02F 1/1362* (2006.01)
  *G02F 1/00* (2006.01)
(52) U.S. Cl.
  CPC ........ *G02F 1/136209* (2013.01); *G02F 1/009* (2013.01); *G02F 2001/133388* (2013.01)
(58) Field of Classification Search
  CPC ......... G02F 2001/133388; G02F 1/009; G02F 1/13473; G02F 1/133371; G02F 2001/136222; G02F 2001/136218; H01J 11/44; H01J 2211/444; H01J 2329/323; H01J 29/327
  USPC .................................................. 349/106–111
  See application file for complete search history.

(56) References Cited

U.S. PATENT DOCUMENTS

| | | | | |
|---|---|---|---|---|
| 2005/0083536 | A1* | 4/2005 | Fouquet | A61B 5/0066 356/512 |
| 2007/0242193 | A1* | 10/2007 | Shin | G02F 1/133512 349/106 |
| 2008/0032209 | A1* | 2/2008 | Imken | H05K 3/0082 430/5 |
| 2011/0084289 | A1* | 4/2011 | Tseng | G02F 1/136209 257/89 |
| 2011/0123729 | A1* | 5/2011 | Lee | G02F 1/133512 428/1.6 |
| 2015/0331292 | A1* | 11/2015 | Yang | G02F 1/133512 349/40 |
| 2018/0086717 | A1* | 3/2018 | Hikida | C07D 233/60 |
| 2018/0120627 | A1 | 5/2018 | Ni et al. | |
| 2018/0299724 | A1 | 10/2018 | Gu et al. | |
| 2019/0041687 | A1 | 2/2019 | Cheng et al. | |

FOREIGN PATENT DOCUMENTS

| | | |
|---|---|---|
| CN | 106154632 A | 11/2016 |
| CN | 106249488 A | 12/2016 |
| CN | 106990600 A | 7/2017 |
| CN | 206946152 U | 1/2018 |
| KR | 20080088138 A | 10/2008 |

OTHER PUBLICATIONS

Notice of Transmittal of the International Search Report of PCT/CN2018/082369 in Chinese, dated Jun. 22, 2018.
Written Opinion of the International Searching Authority of PCT/CN2018/082369 in Chinese, dated Jun. 22, 2018 with English translation.

* cited by examiner

DISPLAY SUBSTRATE, MANUFACTURING METHOD THEREOF, DISPLAY PANEL, AND DISPLAY DEVICE

CROSS REFERENCE TO RELATED APPLICATIONS

This application is the National Stage of PCT/CN2018/082369 filed on Apr. 9, 2018, which claims priority under 35 U.S.C. § 119 of Chinese Application No. 201710423069.9 filed on Jun. 7, 2017, the disclosure of which is incorporated by reference.

TECHNICAL FIELD

At least one embodiment of the present disclosure relates to a display substrate, a manufacturing method thereof, a display panel, and a display device.

BACKGROUND

With the rapid development of display technology, thin film transistor liquid crystal display (TFT-LCD) with narrow frame has become the current mainstream display device. Correspondingly, how to solve the problem of electrostatic interference has become a major problem for a display device with narrow frame.

Although each film layer in a color filter substrate in a display device (especially a black matrix of a non-display area of the display device) is capable of accumulating and transmitting a part of static electricity, so that the static electricity cannot enter the display area. However, upon the display device displaying an image, due to a narrow frame of the display device, the static electricity transmission may not be smooth upon the frame of the display device being touched, and an edge of the display area has the problem of display defects such as purplish or greenish defect.

SUMMARY

The embodiments of the present disclosure provide a display substrate, including a display region and a non-display region located around the display region, the display substrate includes: a base substrate, and a black matrix located in the non-display region on the base substrate; at least one concave portion is located in the black matrix, and the at least one concave portion is filled with an non-transparent insulating material.

In one example, each of the at least one concave portion is an annular slot surrounding the display area.

In one example, the non-transparent insulating material is a photoresist material doped with a black insulating material.

In one example, a resistivity of the photoresist material is different from a resistivity of the black matrix by more than 5 orders of magnitude.

In one example, the black insulating material includes copper oxide.

In one example, in a direction perpendicular to the base substrate, the non-transparent insulating material is protruded from a surface of the black matrix away from the base substrate.

In one example, the display substrate is a color filter substrate.

Another embodiment of the present disclosure provides a manufacturing method of a display substrate, the display substrate includes a display area and a non-display area located around the display area, the manufacturing method includes: providing a base substrate; forming a black matrix located in the non-display area on the base substrate; forming at least one concave portion in the black matrix located in the non-display area; and filling an insulating material in the at least one concave portion, wherein a color of the insulating material is capable of becoming non-transparent.

In one example, each of the at least one concave portion is an annular slot surrounding the display area.

In one example, the insulating material is a photoresist material doped with a thermosensitive color changing material.

In one example, filling the insulating material in the at least one concave portion includes: doping 20% to 30% of the thermosensitive color changing material into the photoresist material by a physical doping method, wherein the thermosensitive color changing material includes basic copper carbonate; and filling the photoresist material doped with the thermosensitive color changing material in the at least one concave portion by one patterning process.

In one example, filling the insulating material in the at least one concave portion is performed such that the non-transparent insulating material is protruded from a surface of the black matrix away from the base substrate in a direction perpendicular to the base substrate. In one example, a resistivity of the photoresist material is different from a resistivity of the black matrix by more than 5 orders of magnitude.

In one example, after filling the non-transparent insulating material in the at least one concave portion, the method further includes: heating the photoresist material doped with the thermosensitive color changing material to make the thermosensitive color changing material become non-transparent.

Another embodiment of the present disclosure provides a display panel, including any one of the abovementioned display substrate and an counter substrate disposed opposite thereto.

Another embodiment of the present disclosure provides a display device, including the abovementioned display panel.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

A ring of an outer slot can be provided in a black matrix of a non-display area of a display device, and the outer slot can form a ring of insulator to avoid a display defect such as purplish or greenish defect at an edge of the display region caused by static electricity transmitting to a display area.

However, a risk of light leakage at the periphery of a display device upon displaying an image is increased by only providing a ring of outer slot in the black matrix of the non-display area, resulting in a relatively poor display effect of the display device.

Figure 1:
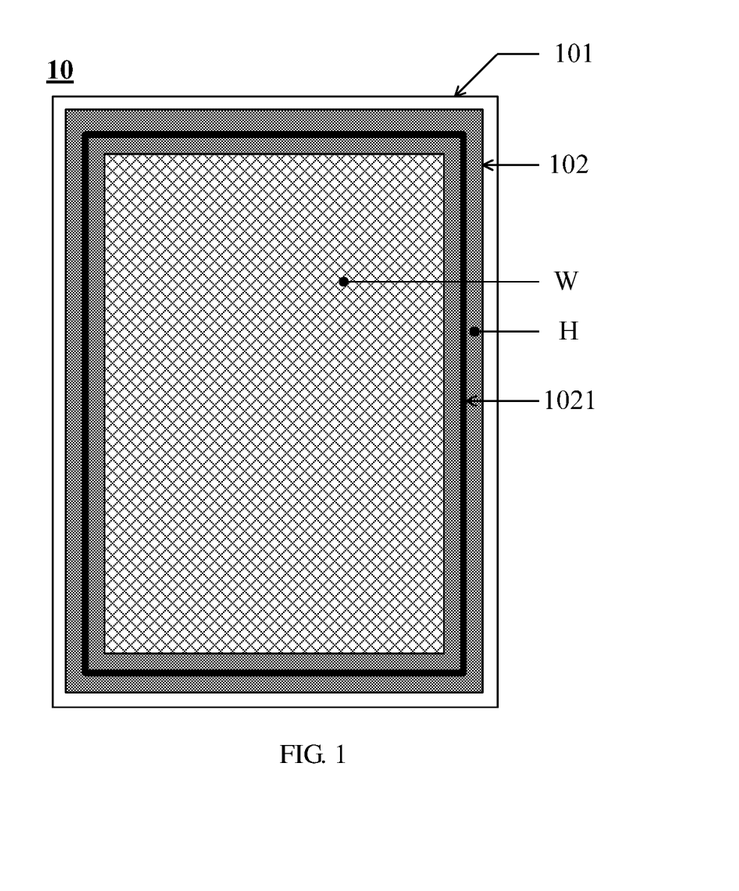
FIG. 1 is a structural schematic diagram of a color filter substrate provided by an embodiment of the present disclosure.

An embodiment of the present disclosure provides a color filter substrate 10, as illustrated by FIG. 1, the color filter substrate 10 includes:

A base substrate 101 and a black matrix disposed on the base substrate, a light emitting surface of the base substrate 101 includes a display area W and a non-display area H located around the display area.

The black matrix 102 located in the non-display area H is provided with at least one annular slot, and the at least one annular slot is filled with a non-transparent insulating material. Herein, the non-transparent insulating material refers to that a light absorbing ratio of the insulating layer material is, for example, 70% or more. In one example, the non-transparent insulating material has an absorbing ratio of 90% or more. For example, the non-transparent insulating material has a black color. For example, each of the at least one annular slot surrounds the display area W, that is, each of the at least one annular slot is a closed annular structure.

In summary, in the color film substrate provided by the embodiment of the present disclosure, a non-transparent insulating material is filled in the annular slot on the black matrix located in the non-display region, thereby ensuring a capability of preventing static interference while reducing a risk of light leakage at the periphery of a display panel upon displaying an image. And the display effect of the display panel is improved.

Optionally, in the color film substrate 10, the black matrix 102 in the non-display area H can be provided with one or more annular slots. The embodiments of the present disclosure are described by taking the following two achievable structures of color filter substrates as examples, including:

In the first achievable structure, as illustrated by FIG. 1, the black matrix 102 located in the non-display region H is provided with one annular slot, which is assumed as a first annular slot 1021 in FIG. 1.

It should be noted that, the first annular slot 1021 surrounds the display area W, and a distance between the first annular slot 1021 and an edge of the display area W can be 0.02 mm, and the first annular slot 1021 is filled with a non-transparent insulating material.

Figure 2:
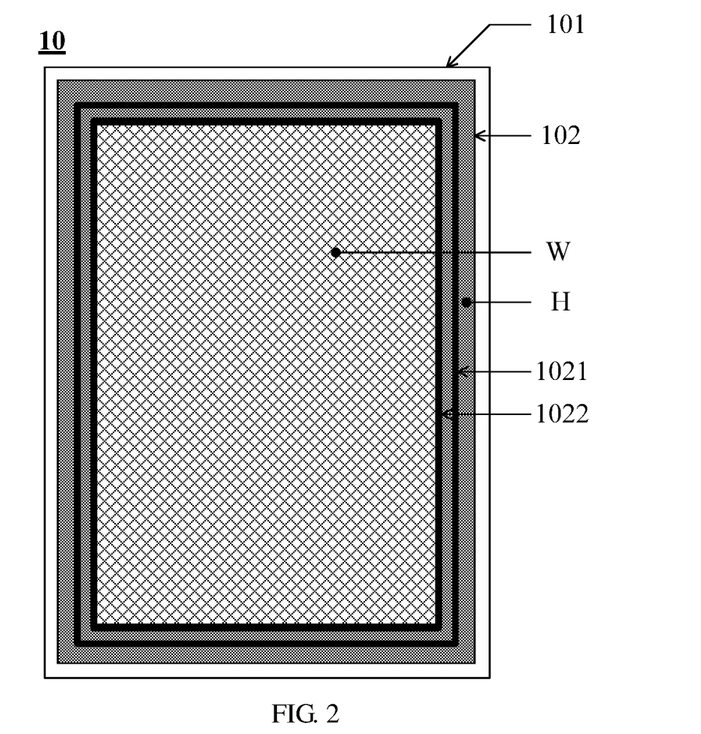
FIG. 2 is a structural schematic diagram of another color filter provided by an embodiment of the present disclosure.

In the second achievable structure, as illustrated by FIG. 2, the black matrix 102 located in the non-display area H can be provided with two annular slots, which are assumed as a first annular slot 1021 and a second annular slot 1022 in FIG. 2, respectively. The first annular slot 1021 is located outside the second annular slot 1022. The capability of preventing static interference of the display panel can be further improved by provided with two annular slots. Optionally, the second annular slot 1022 can be located at a boundary between the black matrix 102 located in the non-display area H and the display area W. As illustrated by FIG. 2, both the first annular slot 1021 and the second annular slot 1022 are filled with the non-transparent insulating material. For example, at least one of the first annular slot 1021 and the second annular slot 1022 is filled with the non-transparent insulating material, thereby ensuring a capability of preventing static interference while reducing a risk of light leakage at the periphery of the display panel upon displaying an image.

The non-transparent insulating material can be a material having a resistivity greater than a predetermined resistivity and being opaque. For example, the non-transparent insulating material can be a photoresist material (photo spacer; referred to as: PS) doped with a thermosensitive color-changing material. Optionally, the photoresist material can be doped with 20% to 30% of the thermosensitive color changing material. A resistivity of the photoresist material is generally $1\times10^{16}$ ohm meters (unit symbol: $\Omega \cdot m$), and a resistivity of black matrix is generally $1\times10^6$ $\Omega \cdot m$. Because the resistivity of PS is much larger than the resistivity of black matrix, it can play a relatively good insulating effect by filling the photoresist material into the annular slot, thereby ensuring the capability of preventing static interference of the display panel.

The photoresist material doped with the thermosensitive color changing material filled in the annular slot can have a thickness greater than a depth of the annular slot.

Figure 3:
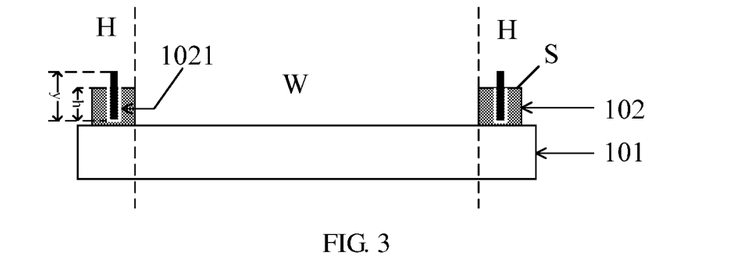
FIG. 3 is a sectional schematic diagram of the color filter substrate illustrated by FIG. 1.

For example, FIG. 3 is a schematic sectional view of the color filter substrate illustrated by FIG. 1, the structure of the display area W (a area between the two vertical dashed lines in FIG. 3) can refer to the structure of the related color filter substrates, and is not drawn or illustrated in the figure. As illustrated by FIG. 3, the photoresist material doped with the thermosensitive color changing material filled in the first annular slot 1021 can have a thickness y greater than a depth h of the first annular slot 1021; that is, the photoresist material doped with the thermosensitive color changing material is higher than a surface S of the black matrix 102 provided with the first annular slot 1021. Thus, while reducing the risk of light leakage at the periphery of the display panel upon displaying an image, the stability of the cell after cell-assembling can be maintained, so as to play a support role upon bonding the color filter substrate and an array substrate.

Optionally, the thermosensitive color changing material can include a thermosensitive microcapsule including basic copper carbonate, and a manufacturing process of the thermosensitive microcapsule can include:

S1: preparing 50 ml of 0.1 mol per liter (mol/L) of copper sulfate solution, preparing 30 ml of 0.2 mol/L sodium carbonate solution, adding the sodium carbonate solution to the copper sulfate solution to produce a blue-green chemical reaction Precipitation of basic copper carbonate, washing and filtering the blue-green basic copper carbonate precipitate, and adding an appropriate amount of gelatin to the blue-green basic copper carbonate precipitate to prepare a blue-green dye.

S2: mixing the abovementioned blue-green dye and styrene-acrylate in an ethanol solution, performing an emulsifying treatment to obtain an emulsion.

S3: under a nitrogen atmosphere, adding azobisisobutyronitrile and isobutyl nitrile dithiobenzoate in the emulsion obtained by S2, and phenylacetic acid-acrylate is copolymerized in situ to form a wall material of the thermosensitive microcapsule, thereby generating the thermosensitive microcapsule.

The azobisisobutyronitrile is an initiator, and the isobutyl nitrile dithiobenzoate is a regulator.

Furthermore, the photoresist material can be doped with 20% to 30% of the thermosensitive microcapsules by a physical doping method, and the composition of the doped photoresist material may include: 50% to 60% of polyethylene terephthalate, 1% to 5% of polypropylene, 5% to 10% of acrylic polymer, 20% to 30% of thermosensitive microcapsules, and less than 2% of additive. Herein, for example, all percentages are mass percentages.

In summary, in the color film substrate provided by the embodiment of the present disclosure, the non-transparent insulating material is filled in the annular slot(s) on the black matrix located in the non-display region, thereby ensuring a capability of preventing static interference while reducing a risk of light leakage at the periphery of a display panel upon displaying an image. And the display effect of the display panel is improved.

Figure 4:
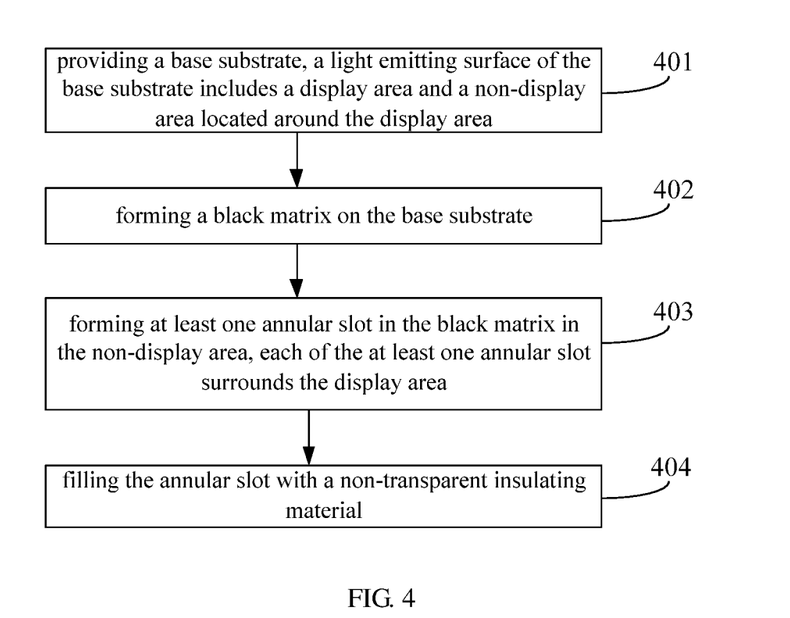
FIG. 4 is a flow diagram of a manufacturing method of a color filter substrate provided by an embodiment of the present disclosure.

An embodiment of the present disclosure provides a manufacturing method of a color filter substrate. As illustrated by FIG. 4, the manufacturing method may include:

Step 401: providing a base substrate, a light emitting surface of the base substrate includes a display area and a non-display area located around the display area.

Step 402: forming a black matrix on the base substrate.

Step 403: forming at least one annular slot in the black matrix in the non-display area, each of the at least one annular slot surrounds the display area.

Step 404: filling the annular slot with a non-transparent insulating material.

In summary, the manufacturing method of a color filter substrate provided by the present embodiment of the present disclosure fills an annular slot in the black matrix in the non-display area with a non-transparent insulating material, to ensure a capability of preventing static interference of a display panel while reducing a risk of light leakage at the periphery of a display panel upon displaying an image. And the display effect of a display panel is improved.

Optionally, referring to FIG. 1 or FIG. 2, in the color film substrate 10, the black matrix 102 in the non-display area H can be provided with one or more annular slots. The embodiments of the present disclosure are described by taking the following two achievable structures of color filter substrates as examples, including:

In the first achievable structure, as illustrated by FIG. 1, the black matrix 102 located in the non-display region H is provided with one annular slot, which is assumed as a first annular slot 1021 in FIG. 1.

It should be noted that, the first annular slot 1021 surrounds the display area W, and a distance between the first annular slot 1021 and an edge of the display area W can be 0.02 mm, and the first annular slot 1021 is filled with a non-transparent insulating material.

In the second achievable structure, as illustrated by FIG. 2, the black matrix 102 located in the non-display area H can be provided with two annular slots, which are assumed as a first annular slot 1021 and a second annular slot 1022 in FIG. 2, respectively. The first annular slot 1021 is located outside the second annular slot 1022. The capability of preventing static interference of the display panel can be further improved by disposing two annular slots.

Optionally, the second annular slot 1022 can be located at a boundary between the black matrix 102 located in the non-display area H and the display area W. As illustrated by FIG. 2, both the first annular slot 1021 and the second annular slot 1022 are filled with the non-transparent insulating material. For example, at least one of the first annular slot 1021 and the second annular slot 1022 is filled with the non-transparent insulating material, thereby ensuring a capability of preventing static interference while reducing a risk of light leakage at the periphery of the display panel upon displaying an image.

The non-transparent insulating material can be a material having a resistivity greater than a predetermined resistivity and being opaque. For example, the non-transparent insulating material can be a photoresist material (photo spacer; referred to as: PS) doped with a thermosensitive color-changing material. Optionally, the photoresist material can be doped with 20% to 30% of the thermosensitive color changing material. A resistivity of the photoresist material is generally $1 \times 10^{16}$ ohm meters (unit symbol: $\Omega \cdot m$), and a resistivity of black matrix is generally $1 \times 10^6$ $\Omega \cdot m$. Because the resistivity of the PS is much larger than the resistivity of black matrix, it can play a relatively good insulating effect by filling the photoresist material in the annular slot, thereby ensuring the capability of preventing static interference of the display panel.

Figure 5:
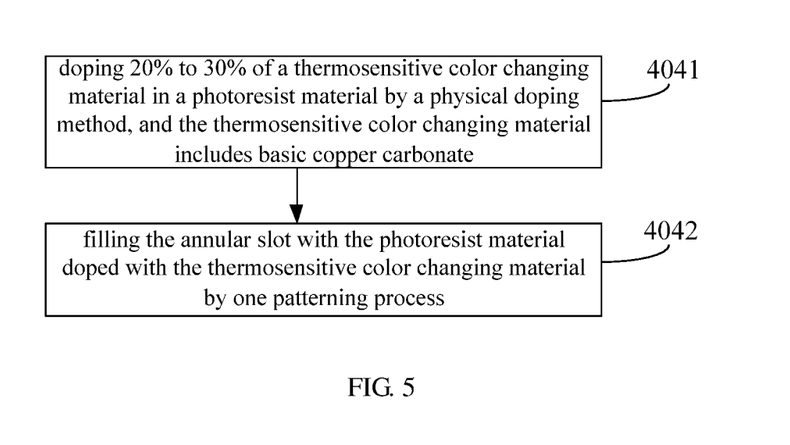
FIG. 5 is a flow diagram of a method of filling an non-transparent insulating material in an annular slot provided by an embodiment of the present disclosure.

Correspondingly, a method for filling the annular slot with the non-transparent insulating material, as illustrated by FIG. 5, can include:

Step 4041: doping 20% to 30% of a thermosensitive color changing material in a photoresist material by a physical doping method, and the thermosensitive color changing material includes basic copper carbonate.

The thermosensitive color-changing material can be a thermosensitive microcapsule including basic copper carbonate. A manufacturing process of the thermosensitive microcapsule can refer to the description of the abovementioned device, and the embodiments of the present disclosure are not limited thereto.

Optionally, the photoresist material is doped with 20% to 30% of the thermosensitive microcapsule by a physical doping method, and the composition of the doped photoresist material may include: 50% to 60% of polyethylene terephthalate, 1% to 5% of polypropylene, 5% to 10% of acrylic polymer, 20% to 30% of thermosensitive microcapsules, and less than 2% of additive.

Step 4042: filling the annular slot with the photoresist material doped with the thermosensitive color changing material by one patterning process.

One patterning process can include: photoresist coating, exposure, development, etching, and photoresist stripping.

Optionally, the process of filling the annular slot with the photoresist material doped with the thermosensitive color changing material can include:

A photoresist material doped with a thermosensitive color-changing material is uniformly coated on a base substrate on which the black matrix is formed, and is exposed, developed, etched, and stripped to form a blue-green PS (photo spacer) pattern on the base substrate. In a related art, spacers of the display area are generally formed on the black matrix of the display area, so the color of the spacers does not affect the light emitting effect of the color filter substrate. The blue-green PS pattern formed on the base substrate can include spacers in the display area and the filler in the annular slot in the non-display area. In the embodiments of the present disclosure, the spacers can be formed on the black matrix of the display area while filling the annular slot with the non-transparent insulating material by one patterning process, without adding other processes, so as to achieve a simple process.

During a subsequent baking process, the blue-green basic copper carbonate is heated to react and form black copper oxide, and the reaction is irreversible, so that a black insulating material can be formed in the annular slot, which reduces the risk of light leakage at the periphery of a display panel upon displaying an image.

The photoresist material doped with the thermosensitive color changing material filled in the annular slot can have a thickness greater than a depth of the annular slot.

For example, FIG. 3 is a schematic sectional view of the color filter substrate illustrated by FIG. 1. As illustrated by FIG. 3, the photoresist material doped with the thermosensitive color changing material filled in the first annular slot 1021 can have the thickness y greater than the depth h of the first annular slot 1021; that is, the photoresist material doped with the thermosensitive color changing material is higher than the surface S of the black matrix 102 provided with the first annular slot 1021. Thus, while reducing the risk of light leakage at the periphery of the display panel upon displaying an image, the stability of the cell after cell-assembling can be maintained, so as to play a support role upon bonding the color filter substrate and an array substrate.

It should be noted that, the sequence of the steps of the manufacturing method of the color filter substrate provided by the embodiment of the present disclosure can be appropriately adjusted, and the steps can also be correspondingly increased or decreased according to the situation. Within the technological scope disclosed by the present disclosure, any variations easily envisaged by those skilled in the art can be within the protection scope of the present disclosure, which is not described again.

In summary, the manufacturing method of a color filter substrate provided by the present embodiment of the present disclosure fills an annular slot in the black matrix in the non-display area with a non-transparent insulating material, to ensure a capability of preventing static interference of a display panel while reducing a risk of light leakage at the periphery of the display panel upon displaying an image. And the display effect of a display panel is improved.

A person skilled in the art can clearly understand that: for the convenience and brevity of the description, the processes in the foregoing method embodiments may refer to the specific working process of the unit in the foregoing device embodiments, and details are not omitted herein.

Figure 6:
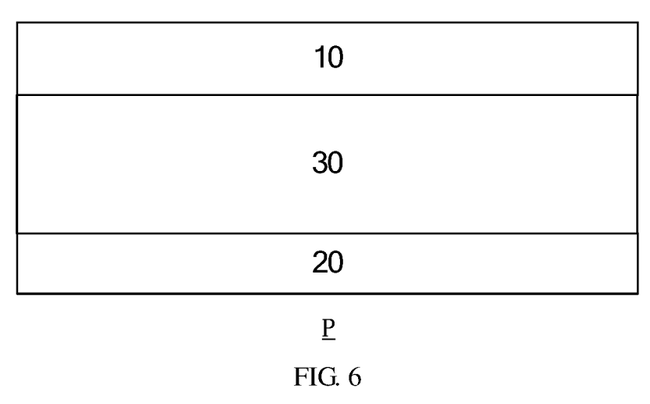
FIG. 6 is a block diagram of a display panel provided by an embodiment of the present disclosure.

An embodiment of the present disclosure provides a display panel P. Referring to FIG. 6, the display panel may include the color filter substrate 10 according to the abovementioned embodiments, and the color filter substrate can be a color filter substrate as illustrated by any one of FIGS. 1 to 3.

The display panel P further includes an array substrate 20 cell-assembled with the color filter substrate 10, and a liquid crystal layer 30 between the color filter substrate and the array substrate.

In summary, in the display panel provided by embodiment of the present disclosure, an annular slot in the black matrix of the non-display area is filled with a non-transparent insulating material, thereby ensuring a capability of preventing static interference of a display panel while reducing a risk of light leakage at the periphery of the display panel upon displaying an image. And the display effect of a display panel is improved.

Figure 7:
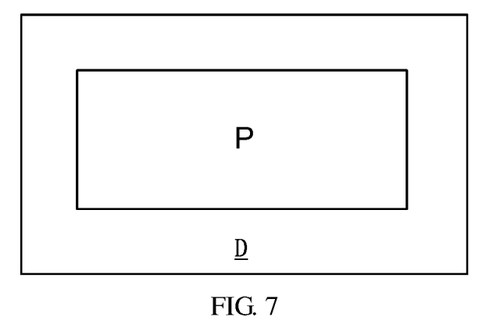
FIG. 7 is a block diagram of a display device provided by an embodiment of the present disclosure.

An embodiment of the present disclosure provides a display device D. Referring to FIG. 7, the display device may include the display panel P according to the abovementioned embodiment.

For example, the display device provided by the embodiment of the present disclosure can be any product or component having a display function, such as a mobile phone, a tablet computer, a television, a display, a notebook computer, a digital photo frame, a navigator, and the like.

In summary, in the display device provided by embodiment of the present disclosure, an annular slot in the black matrix in the non-display area is filled with a non-transparent insulating material, thereby ensuring a capability of preventing static interference of a display panel while reducing a risk of light leakage at the periphery of the display panel upon displaying an image. And the display effect of a display panel is improved.

The foregoing is only the embodiments of the present disclosure and not intended to limit the protection scope of the present disclosure, alternations or replacements which can be easily envisaged by any skilled person being within the spirit and principle of the present disclosure shall fall into the protection scope of the present disclosure.

What is claimed is:

1. A manufacturing method of a display substrate, wherein the display substrate comprises a display area and a non-display area located around the display area, the manufacturing method comprises:
   providing a base substrate;
   forming a black matrix located in the non-display area on the base substrate;
   forming at least one concave portion in the black matrix located in the non-display area; and
   filling an insulating material in the at least one concave portion, wherein a color of the insulating material is capable of becoming non-transparent, and the insulating material is a photoresist material doped with a thermosensitive color changing material; wherein filling the insulating material in the at least one concave portion comprises:
   doping 20% to 30% of the thermosensitive color changing material into the photoresist material by a physical doping method, wherein the thermosensitive color changing material comprises basic copper carbonate; and
   filling the photoresist material doped with the thermosensitive color changing material in the at least one concave portion by a patterning process.

2. The method according to claim 1, wherein each of the at least one concave portion is an annular slot surrounding the display area.

3. The method according to claim 1, wherein filling the insulating material in the at least one concave portion is performed such that the non-transparent insulating material is protruded from a surface of the black matrix away from the base substrate in a direction perpendicular to the base substrate.

4. The method according to claim 1, wherein a resistivity of the photoresist material is different from a resistivity of the black matrix by more than 5 orders of magnitude.

5. The method according to claim 1, further comprising, after filling the insulating material in the at least one concave portion, heating the photoresist material doped with the thermosensitive color changing material to make the thermosensitive color changing material become non-transparent.

\* \* \* \* \*